United States Patent [19]

Spencer

[11] 3,709,342
[45] Jan. 9, 1973

[54] TIME DELAY ELECTROMAGNETIC CLUTCH

[75] Inventor: Glenn S. Spencer, Horseheads, N.Y.

[73] Assignee: The Bendix Corporation

[22] Filed: Sept. 21, 1971

[21] Appl. No.: 182,337

[52] U.S. Cl. .................192/52, 192/84 R, 192/84 A, 192/84 AB, 188/164
[51] Int. Cl. .............................................F16d 27/06
[58] Field of Search........192/52, 84 R, 84 A, 84 AB; 188/161, 164

[56] References Cited

UNITED STATES PATENTS

| 727,641 | 5/1903 | Knowlton | 192/84 AB |
| 727,689 | 5/1903 | Reist | 192/84 AB |
| 786,413 | 4/1905 | Cutler | 192/84 AB |
| 859,523 | 7/1907 | Rowell | 192/84 AB |
| 1,671,057 | 5/1928 | Brainard | 192/84 R |

*Primary Examiner*—Allan D. Herrmann
*Attorney*—Bruce A. Yungman

[57] ABSTRACT

An electromagnetic clutch or brake including means for automatically retarding or slowing the engagement and release of the armature is shown herein. An additional coil comprising one or more shorted turns of high current capacity wire is included within the magnet body forming an electromagnetic coupling with the main coil to impede the generation and collapse of the main coil-induced electromagnetic field. Switching means connected in series circuit relationship with the additional coil and located externally of the clutch may also be included so that application of the magnetically retarded coil can be selective.

6 Claims, 4 Drawing Figures

PATENTED JAN 9 1973 3,709,342

TIME DELAY ELECTROMAGNETIC CLUTCH

CROSS REFERENCE TO RELATED APPLICATIONS

This case is related to my commonly assigned co-pending patent applications Ser. Nos. 182,338 and 182,339 filed on even date.

FIELD OF THE INVENTION

This invention relates generally to a d.c. time delay electromagnetic relay, and more particularly to an electromagnetic coupling operatively associated with an electromagnetic clutch.

BRIEF DESCRIPTION OF THE PRIOR ART

When an electromagnetic clutch is energized, the change in magnetic flux level, from zero to nominal operating level, causes a voltage to be induced in any nearby metal. In the iron of the clutch magnet body and armature plate, this results in a large momentary or eddy current which follows a circular path, opposite and parallel to the coil current and perpendicular to the flux. The magnetomotive force created by this eddy current opposes that of the main coil current and results in slowing the rate at which the magnetism rises. When the clutch is deenergized, the falling flux again generates a large eddy current, this time flowing in the opposite direction, (i.e., in the same direction as the coil current) producing a magnetomotive force which aids the main field and delays its collapse. The slow magnetic response that such induced currents cause, both at energization and at deenergization of the coil, is generally undesirable. Commonly assigned U.S. Pat. No. 3,327,822 covers a clutch in which an interruption in the iron ring of the magnet body and armature eliminates the eddy current and speeds the magnetic response.

Rapid response, however, is not always a desirable feature. In single surface clutches of the dry friction type, for example, a slow application of torque is generally preferable because of the "soft clutching" and "feathering in" resulting therefrom. This is particularly true where a clutch has been sized to the stall torque of the prime mover. Such a clutch would otherwise deliver excessive shock torques in normal day to day service, causing abnormal wear of the clutch faces and possible breakage of associated drive members.

SUMMARY OF THE INVENTION

In order to overcome the inherent defects of a rapidly responding electromagnetic clutch as described above, a second coil consisting of at least one complete turn of copper or other conductive material is nested with the main coil in a cavity in the clutch magnet body. This second coil provides a current path with much higher conductivity than the iron of the magnet body and results in an increased and more effective eddy current. The generated flux of the main magnetic field, having to overcome the increased magnetomotive opposition generated by the second coil will build and decay more slowly and clutch torque will be applied and released more gradually. The total cross sectional area of the second coil can be properly sized to yield the desired delay for any particular electromagnetic clutch design and application. Means for selectively applying the magnetically retarding coil may also be included.

It is, therefore, a primary object of this invention to provide an improved electromagnetic friction device having means for automatically retarding the magnetic response of the electromagnetic members upon energization and deenergization of the primary electromagnetic coil, so that transmitted torque will be applied and released more gradually.

It is another object of this invention to provide a time delay electromagnetic clutch or brake in which engagement and disengagement is automatically retarded.

It is still another object of this invention to provide a time delay electromagnetic clutch having second electromagnetic coil means for retarding the electromagnetic response of the armature upon energization and deenergization of the primary electromagnetic coil, the second electromagnetic coil means being in electromagnetic flux circuit relationship with the primary electromagnetic coil.

It is still a further object of this invention to provide a time delay electromagnetic clutch which takes advantage of the inherent characteristics of an electromagnetic coupling thereby slowing clutch engagement and disengagement by impeding the generation and collapse of the coil-induced electromagnetic field whenever the coil is energized and deenergized.

It is yet another object of this invention to provide an electromagnetic clutch having means for retarding the magnetic response of the armature such that torque transmission between input and output members is gradually applied.

It is still another object of this invention to provide a time delay electromagnetic clutch which eliminates excessive shock torques thereby prolonging the life of the clutch faces and the associated drive members.

It is a still further object of this invention to provide in a time delay electromagnetic clutch having second electromagnetic coil means for retarding the magnetic response of the armature to the primary coil, switching means located externally of the clutch so that the retarding effect of the time delay coil may be selectively applied or completely disconnected from the electromagnetic circuit.

Other objects and advantages of this invention will become apparent from the following detailed description taken in conjunction with the accompanying drawing.

DETAILED DESCRIPTION OF THE PREFERRED EMBODIMENT

Figure 1:
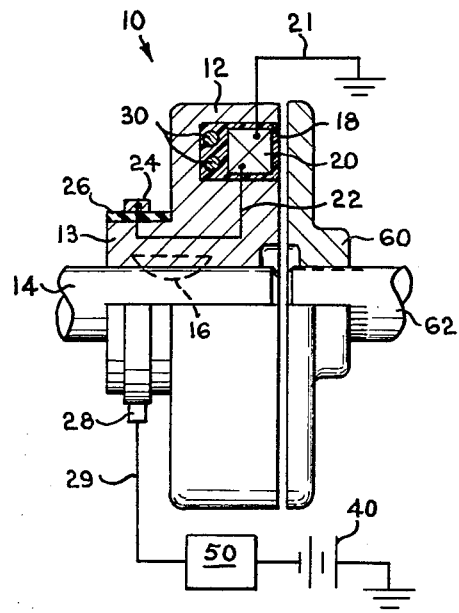
FIG. 1 shows a schematic partial cross-section view of the preferred embodiment of my electromagnetic clutch.

Referring to FIG. 1 of the drawing, my electromagnetic clutch is shown, generally designated by numeral 10. The clutch includes a rotatable magnet body 12 adapted to be secured to a first torque transmitting means, power shaft 14, by means of a key and key-way slot shown generally as 16. Although the preferred embodiment relates specifically to an electromagnetic clutch, it should be obvious to those skilled in the art that the teaching of my invention may be equally applied to an electromagnetic brake where the magnet body member 12 does not normally rotate; also, my invention would be equally effective in a stationary field clutch where the coil 20 and magnet body 12 are non-rotatable members. Magnet body 12 is fabricated of magnetic flux conducting material such as iron or steel. An annular recess or cavity 18 is formed within the magnet body 12 and has disposed therein the primary electromagnetic coil 20 and the separate but substantially adjacent time delay coil 30 of my invention. Coils 20 and 30 may be secured within cavity 18 by resin or other conventional means.

Coil 20 has two leads 21, and 22; lead 21 is connected to ground and lead 22 is connected to slip ring 24. Slip ring 24 is fixedly secured to an annular electrical insulation member 26. Member 26 is fabricated from rubber or other suitable electrical insulating material and is mounted on an axially extending shoulder 13 provided on magnet body 12. Electrical power is supplied to slip ring 24 from battery 40 through lead 29 which is connected to a brush 28. Lead 29 and power source 40 are in circuit relationship with a control circuit shown generally as the box 50, which control circuit triggers the energization and/or deenergization of the primary coil 20.

The clutch of the present invention is reversible with respect to input and output sides and thus, clutch structure which in one installation would be an input member in another installation would be an output member. Accordingly, rotating input and output members are referred to generically as first and second torque transmitting members.

Juxtaposed and coaxially aligned with magnet body 12 is armature 60. Armature 60 is slidably splined to the terminal end of second torque transmitting means power shaft 62. Armature 60 is adapted to move toward and away from engagement with magnet body 12 upon energization and deenergization of the electromagnetic coil 20. The axial mating faces of magnet body 12 and armature 60 are the clutch faces through which torque is transmitted. Of course, my invention could also be used in a multiple disc clutch, a cone clutch, etc., where the magnet body and the armature are not the principal torque transmitting friction members.

Figure 2:
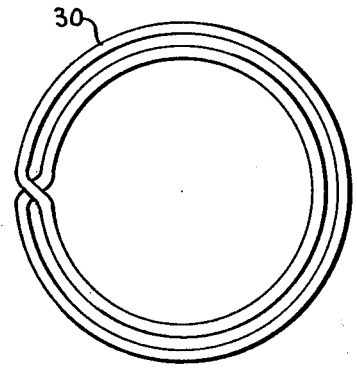
FIG. 2 shows one design of a coil in accordance with my invention.

Referring to FIG. 2, coil 30 is shown as two shorted turns of high current capacity wire. Coil 30 is preferably fabricated from copper or other conductive material which provides a current path with much higher conductivity than the iron of magnet body 12, thus producing a stronger more effective eddy current. It would be obvious to those skilled in the art that the actual configuration of coil 30 is a matter of design choice since it is the cross-sectional area of coil 30 that is determinative of the delay desired; e.g., a solid ring of twice the cross section will provide the same effect as the two rings shown. The cross-sectional area of coil 30 and the armature response rate are directly proportional, holding the size and strength of coil 20 constant; that is, the larger the cross-sectional area of coil 30, the slower the response of the armature.

Coil 30 is shown as having substantially the same diameter of coil 20, both coils being coaxial and perpendicular to the axis of the clutch. However, it is important to recognize that the diameter and position of coil 30 relative to coil 20 is unimportant so long as an electromagnetic coupling is formed by the two coils and the coils are, therefore, in electromagnetic flux circuit relationship. For example, the time delay coil 30 would still perform its function if it were disposed around the O.D. of primary coil 20, or within its I.D., or at any other position so long as it embraced the magnetic field generated by the primary coil 20.

OPERATION OF THE PREFERRED EMBODIMENT

When clutch engagement is desired, a control signal is generated from the control circuit 50 and power is carried to coil 20 by means of the lead wires 22 and 29 and the brush and slip ring 28 and 24 thereby energizing coil 20. The change in flux linkage generated by the coil 20 from zero to nominal operating level causes an electromotive force, i.e., a voltage, to be induced across coil 30. Since coil 30 provides a current path with much higher conductivity than the iron of magnet body 12, a larger more effective eddy current is developed in coil 30. This resultant current induced in coil 30 follows a circular path opposite in direction and parallel to the primary coil current and perpendicular to the flux linkage generated by primary coil 20. A magnetomotive force created by this current opposes that of the main coil current and results in slowing the rate at which magnetism rises in magnet body 12. The flux of the main magnetic field, having to overcome this increased opposition, will build more slowly thereby retarding the movement of armature 60 into engagement with magnet body 12; thus, clutch torque will be applied more gradually.

When the electrical energy supplied to coil 20 is withdrawn, the falling flux again induces a voltage which in turn generates a large eddy current in coil 30, this time flowing in the opposite direction, (i.e., in the same direction as the coil current) producing a magnetomotive force which aids the main flux field and therefore delays its collapse. Thus, armature 60 is more gradually released from its contact with the magnet body 12.

DESCRIPTION OF THE ALTERNATIVE EMBODIMENT

Figure 3:
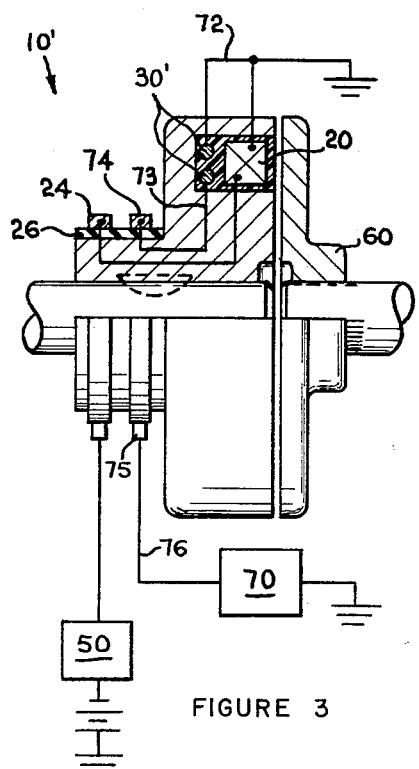
FIG. 3 is a schematic partial cross-sectional view of one alternative embodiment of my electromagnetic clutch.

Referring to FIG. 3 of the drawing, my electromagnetic clutch is shown, designated by numeral 10'. Like parts of clutch 10' have the identical reference numerals of clutch 10 shown in FIG. 1. The basic difference between clutch 10' and clutch 10 is that an external switching means 70 is connected in series circuit relationship to the time delay coil 30'. Coil 30' has two leads 72 and 73; lead 72 is connected to ground and lead 73 is connected to slip ring 74 which is fixedly secured to annular insulation member 26 in a manner similar to slip ring 24 as was described above. Induced current developed in coil 30' is carried to switching means 70 through brush 75 and lead 76.

Figure 4:
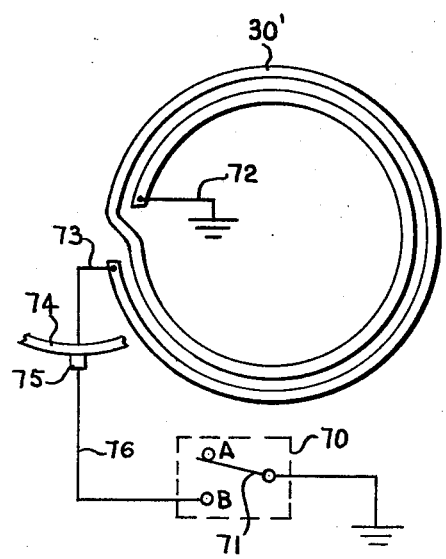
FIG. 4 shows one design of a coil in accordance with my invention that may be used in the alternative embodiment shown in FIG. 3.

Referring to FIG. 4, coil 30' is shown as a discontinuous double turn of high current capacity wire, the terminal ends of which are mounted to lead wires 72 and 73. The switching means 70, which is in communication with coil 30' through lead 76 as described above, consists of a two-position switch 71. The two positions of switch 71 are position A, being an open circuit position, and position B which is a closed circuit position thereby allowing an eddy current to develop in coil 30'. Switch 71 of switching means 70 may be manually moved whenever an open or closed circuit is desired, or movement of switch 71 may be automatically controlled as a feedback or other function of a separate control circuit (not shown).

When switch 71 is in position A, an open circuit exists and thus, an eddy current is not permitted to flow through coil 30' regardless of whether primary coil 20 is being energized or deenergized. When switch 71 is in position B, however, coil 30' will act precisely in the same manner as coil 30 of clutch 10 described above. The advantage of inserting switch 71 into the electromagnetic coupling arrangement described, is to provide selective means for applying the use of the time delay coil. For example, if the response of the armature to the energization and/or deenergization of coil 20 is to be retarded, the switch is moved to position B and the coil 30' will react as coil 30 described above. However, if a normal response of armature 60 is desired, either for engagement and/or disengagement, the retarding effect of coil 30' is defeated by moving switch 71 to the open circuit position, position A.

While only one preferred embodiment and one alternative embodiment of this invention has been disclosed, it will be apparent to those skilled in the art that changes may be made to the invention as set forth in the appended claims, and in some cases, certain features of the invention may be used to advantage without corresponding use of other features. Accordingly, it is intended that the illustrative and descriptive materials herein be used to illustrate the principles of the invention and not to limit the scope thereof.

I claim:

1. In combination with an electromagnetic friction device of the type having a plurality of torque transmitting members, a magnet body operatively associated with at least one of said torque transmitting members, an armature operatively associated with at least one other of said torque transmitting members, said armature adapted to move toward and away from said magnet body, and first electromagnetic coil means having an electrical power lead operative to generate magnetic flux attracting said armature into clutch engagement when energized and operative to release said armature from engagement when deenergized, wherein the improvement comprises:

second coil means for retarding the magnetic response of the armature, said second coil means being in electromagnetic flux circuit relationship with said first electromagnetic coil means such that said first coil means causes a momentary current to be induced in said second coil means whenever energized and whenever deenergized, which current generates magnetomotive opposition to any change in flux levels thereby retarding the magnetic response of the armature both upon clutch engagement and upon clutch disengagement.

2. The combination as claimed in claim 1 wherein said second coil means comprises one or more shorted turns of electrically conductive wire.

3. The combination as claimed in claim 1 wherein said first and second coil means are disposed in a cavity within said magnet body substantially adjacent one another, so that the magnetic field generated by said first coil means will induce a voltage across said second coil means.

4. The combination as claimed in claim 1 including further:

switching means in circuit relationship with said second coil means having an open circuit position so that the second coil means will not conduct a current upon energization and deenergization of said first coil means.

5. The combination as claimed in claim 4 wherein said switching means has a second position for delaying the magnetic response of the armature upon clutch engagement by permitting an eddy current to develop in said second coil means when said first coil means is energized.

6. The combination as claimed in claim 4 wherein said switching means has a second position for delaying the magnetic response of the armature upon clutch disengagement by permitting an eddy current to develop in said second coil means when said first coil means is deenergized.

* * * * *